United States Patent [19]

Ohtsu

[11] 4,245,262
[45] Jan. 13, 1981

[54] DROPOUT COMPENSATING DEVICE

[75] Inventor: Masamitsu Ohtsu, Kadoma, Japan

[73] Assignee: Matsushita Electric Industrial Co., Ltd., Kadoma, Japan

[21] Appl. No.: 61,986

[22] Filed: Jul. 30, 1979

[30] Foreign Application Priority Data

Aug. 3, 1978 [JP] Japan .............................. 53-95313

[51] Int. Cl.³ ..................... H04N 5/795; H04N 5/76
[52] U.S. Cl. ........................................... 360/38; 358/8
[58] Field of Search ............... 358/8, 128.5; 360/36, 360/38

[56] References Cited

U.S. PATENT DOCUMENTS

| | | | |
|---|---|---|---|
| 3,909,518 | 9/1975 | Baker | 360/38 X |
| 3,969,759 | 7/1976 | Amery | 360/38 X |
| 4,017,892 | 4/1977 | Takahara et al. | 360/38 X |
| 4,038,686 | 7/1977 | Baker | 360/38 X |
| 4,189,745 | 2/1980 | Ushio et al. | 360/38 X |

*Primary Examiner*—Raymond F. Cardillo, Jr.
*Assistant Examiner*—Aristotelis M. Psitos
*Attorney, Agent, or Firm*—Stevens, Davis, Miller & Mosher

[57] ABSTRACT

A dropout compensating device for obtaining dropout-compensated video signals by phase- or amplitude-modulating a video signal containing dropouts, replacing the duration of dropouts in the modulated video signal by the signal portions of the modulated video signal leading one horizontal scanning period with respect to the durations of the dropouts, and demodulating the video signal.

5 Claims, 7 Drawing Figures

DROPOUT COMPENSATING DEVICE

This invention relates to a device for compensating dropouts that may arise when video signal is recorded or reproduced.

In the case where a video signal is recorded or reproduced by means of a video tape recorder (VTR), dropouts (losses) of the reproduced signal may result from flaws in the magnetic surface of the recording tape or dust adhering on the tape recording surface so that the quality of the reproduced picture is degraded. Such dropouts can be compensated by substituting a previously reproduced signal leading one horizontal scanning period (hereafter referred to simply as 1H period) in phase into the durations of the dropouts. For the substitution of the signal leading 1H period, there is a need for a delay line having a delay time equal to the 1H period. Inductances and capacitances may constitute such a delay line for a video signal which usually contains a great number of frequency components ranging from zero Hertz (dc component) to about 3 MHz. However, the inductor-capacitor delay line must usually take a complicated structure. The charge transfer elements such as, for example, bucket brigade device (BBD) or charge-coupled device (CCD) have also been suggested for the application to such a delay line. However, since the frequency of the clock signal to drive the charge transfer elements must be high enough to transmit a video signal covering a very wide frequency band, a large number of equivalent stages must be used to obtain a delay time of 1H period and moreover the electrostatic capacitances of the individual stages must be substantially uniform. This last requirement lowers the production yield, leading to high cost. Further, there is a need for a clock signal generator and a drive circuit for driving the charge transfer elements so that the whole circuit configuration will be complicated.

Alternatively, there has been proposed a method in which the delay time of 1H period is attained by the use of an ultrasonic delay line having a simple structure. However, such an ultrasonic delay line cannot transmit low-frequency components (specifically dc components).

Usually, in the case of video signal recording and reproducing, recording is effected after the video signal has been frequency-modulated. Since in such a case the frequency-modulated (or FM) signal contains no low-frequency component, an ultrasonic delay line may be used.

These and other objects, features and advantages of this invention will be apparent from the following description taken in conjunction with the accompanying drawings, in which:

FIG. 1 is a block diagram showing a conventional dropout compensation apparatus using an ultrasonic delay line;

FIG. 2, including a–e, is a waveform diagram showing the process of occurrence of a spike noise;

FIG. 3 is a block diagram showing the dropout compensating device according to this invention;

FIG. 4, including a–f, is a waveform diagram showing the prevention of occurrence of a spike noise according to this invention;

Figure 1:
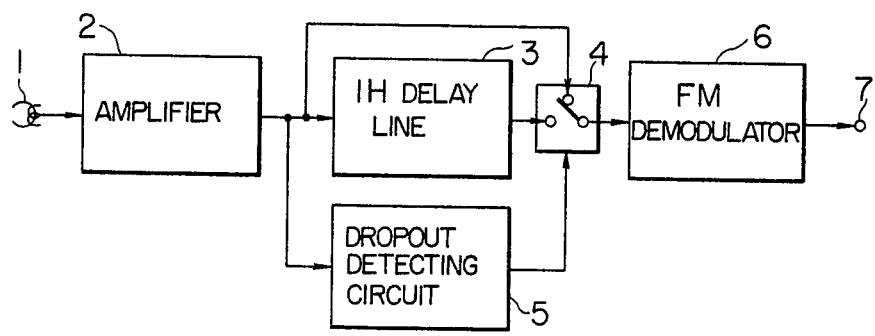

Now, an example of application of an ultrasonic delay line will be described below. It is here assumed that a frequency-modulated signal is recorded on a recording medium. Reference should be had to FIG. 1 of the attached drawings. The FM signal is reproduced on playback by means of a reproducing magnetic head 1, amplified through an amplifier 2 to a desired level, and sent to a 1H delay line 3, a change-over switch 4 and a dropout detecting circuit 5. The dropout detecting circuit 5 rectifies the amplitude of the reproduced FM signal and when the rectified amplitude is below a certain preset level, a dropout is considered to have occurred so that the dropout detecting circuit 5 delivers a control signal to cause the change-over switch 4 to select the 1H delay line 3. On the other hand, the reproduced FM signal is normally applied to the change-over switch 4 and when there is no dropout, it is sent through the switch 4 to a FM demodulator 6. When there is a dropout, the FM signal which has been delayed 1H period through the 1H delay line 3 is sent through the change-over switch 4 to the FM demodulator 6. Namely, the FM demodulator 6 receives at its input terminal dropout-compensated FM signals and the dropout-compensated FM signals are demodulated into original video signals, which are delivered at an output terminal 7.

Although the dropout may be filled by the substitution of a signal portion leading 1H period for the duration of a dropout, the substituting signal is usually out of phase with respect to the substituted one because the FM signal has a large degree of modulation so that a large noise spike is generated at the change-over instant, degrading the quality of the reproduced picture.

Figure 2:
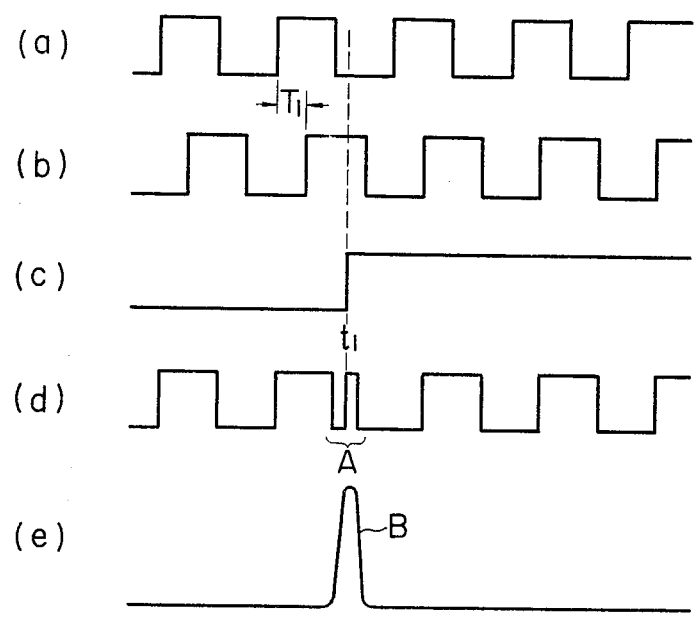

Next, description will be made of how such a noise spike is generated, referring to FIG. 2. An FM signal a having a constant frequency (assume, for example, for simplicity that the video signal is modulated by a dc signal) and the delayed version of the FM signal a having a delay time equal to 1H period (hereafter referred to simply as the 1H delayed version) are supplied to the change-over switch 4. A control signal c controls the switch 4 and if the switch 4 is changed over at an instant $t_1$, a signal d is delivered. It should here be noted that the FM signal a is set out of phase by a period $T_1$ from its 1H delayed version b. When the signal d is supplied to and demodulated by the FM demodulator 6, a signal e containing a noise spike B is generated. For the demodulator 6 delivers an output in accordance with the period of the input signal thereto and since the signal portion A of the signal d has a very short period, the signal e will contain a transient portion (i.e. spike B) having a high level.

This invention aims to provide a device for compensating dropouts, which generates no noise spike.

Now, this invention will be described by way of embodiment.

Figure 3:
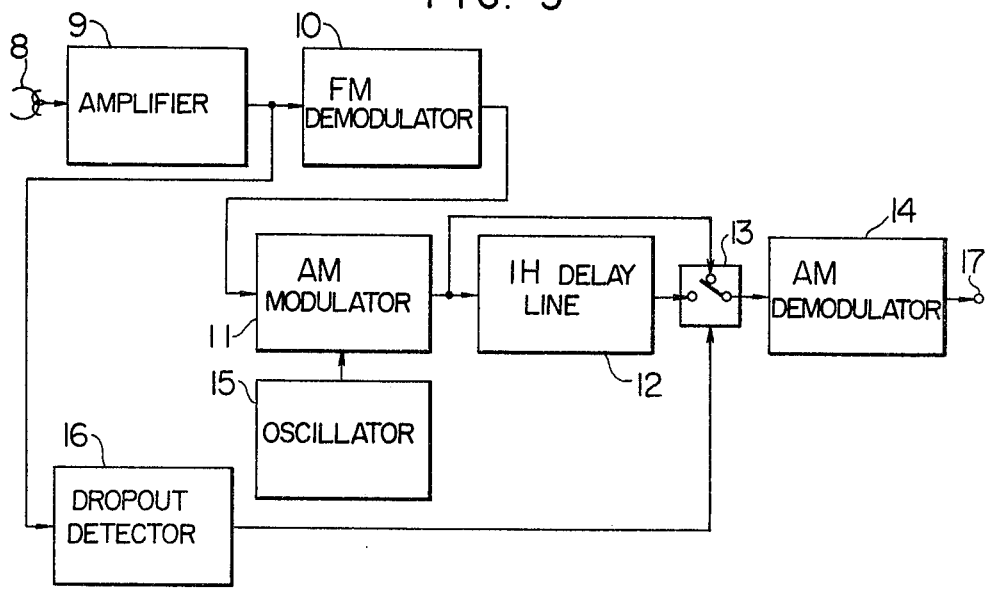

As shown in FIG. 3, an FM signal reproduced by a reproduction magnetic head 8 is amplified to a desired level by an amplifier 9 and thereafter supplied to an FM demodulator 10 and a dropout detector 16. The FM demodulator 10 reproduces the original video signal, which is amplitude-modulated by an AM modulator 11 and then supplied to a 1H delay line 12 and a change-over switch 13. A signal as an AM carrier signal is supplied from an oscillator 15 to the AM modulator 11, the frequency f of the signal being such that $$f = Nf_H \qquad (1)$$

where $f_H$ is the horizontal scanning frequency and N is any integer. The signal having the frequency $f_H$ remains invariant with respect to phase under the operation of delay by a 1H period so that this signal never causes such a noise spike as generated by a conventional device.

The dropout detector 16 rectifies the amplitude of the FM signal applied thereto and delivers a control signal indicative of a dropout when the rectified signal amplitude is smaller than a preset level. The control signal serves to cause the switch 13 to be changed over.

The change-over switch 13 receives the AM signal from the AM modulator 11 and the AM signal as a delayed version obtained by delaying the AM signal from the AM modulator 11 a 1H period through the 1H delay line 12. The switch 13 makes a selection between these signals; when there is a dropout, the delayed signal is delivered by the switch 13 while the non-delayed signal is delivered if there is no dropout detected. This means that a signal containing a dropout is compensated. Then, the dropout-compensated AM signal is demodulated to be a reproduced video signal which is delivered at an output terminal 17.

In the above embodiment of this invention, if a reference signal to compensate the frequency fluctuation of color signal due to the time base fluctuation caused in the recording/reproducing system or a signal having a frequency equal to an integral multiple of the frequency of the reference signal is used, the oscillator 15 for generating the carrier for AM modulation may be dispensed with (the frequency of the reference signal is equal to the color carrier frequency $f_C$). In such a case the circuit configuration is simplified. In the case where the reference signal is used, its frequency $f_C$ is such that $$f = (N + \tfrac{1}{2}) \times f_H \text{ or,}$$

$$f_C = 455/2 f_H \qquad (2)$$

and therefore $f_C$ is not an integral multiple N of $f_H$. Namely, the AM signal is opposite in phase to the 1H delayed version thereof. Therefore, if the AM demodulator 14 is of half-wave rectification type, switching noise is generated while no problem arises where the demodulator 14 is of full-wave rectification type.

Figure 4:
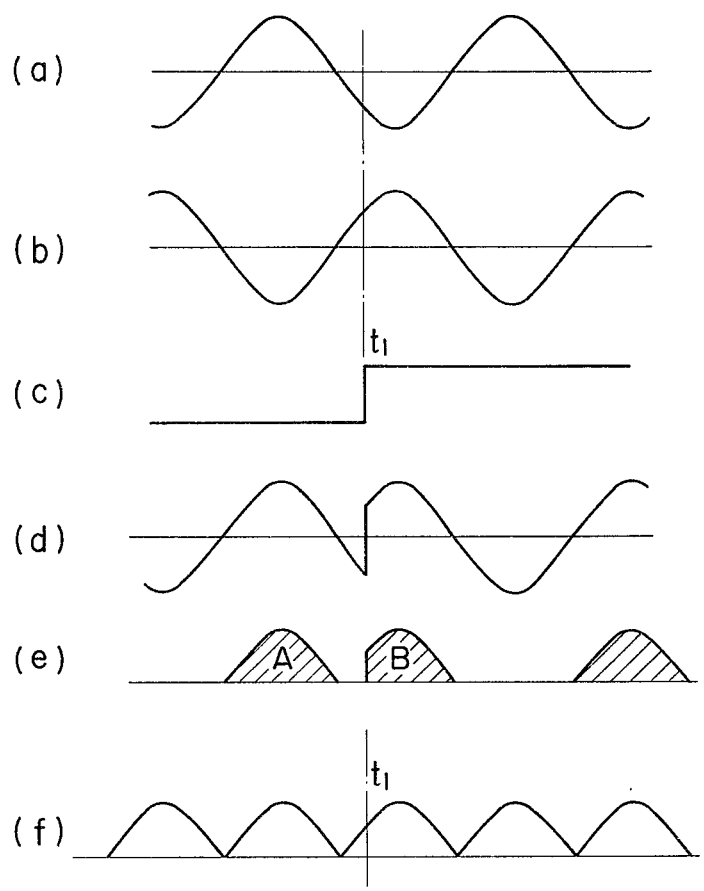

The mechanism of the switching noise being generated will be described in detail with the aid of FIG. 4. As shown in FIG. 4, if a signal a is switched over to a signal b having opposite phase at an instant $t_1$, the resultant signal is a signal d and the half-wave rectified version thereof is a signal e. By passing the signal e through a low-pass filter so as to obtain effective signal component, the cross-hatched portions are reproduced as a demodulated signal. In this case, since the portions A and B are so near each other and since the portion B is an incomplete half-wave component, then a sort of noise is generated in accordance with the incompleteness. On the other hand, if the signal d is full-wave rectified, a complete rectified waveform, i.e. a signal f, is obtained, not resulting in such noise as mentioned above.

Accordingly, if an AM demodulator of half-wave rectification type is used as the AM demodulator 14, the compensating signal having a delay time of 1H period must be set in phase with the compensated signal. If the delay time T equal to the 1H period of the 1H delay line 12 is set such that $$T = T_H \pm \Delta T \qquad (3),$$

both these signals have the same phase. In the expression (3), $$\Delta T = 1/(2 f_C) \qquad (4),$$

where $T_H$ equals the 1H period. Also, the delayed signal having a delay of 1H period or the non-delayed signal may be phase-inverted to obtain the same effect. The above explanation, corresponding to the case where the reference signal $f_C$ is used, shows that if the compensating signal is in phase with the compensated one, the switching noise can be eliminated.

In the above embodiment, the video signal is amplitude-modulated and passed through a 1H delay line. In this case, the AM carrier component still remains to an appreciable extent even after the AM demodulation and therefore the attenuation factor of the low-pass filter for eliminating the carrier component must be large so that the phase characteristic of the reproduced video signal is degraded; the distortion of the phase characteristic such as ringing tends to be caused. The carrier component can be considerably suppressed if the AM carrier is modulated through the phase modulation which is a special case of the Amplitude Modulation. In demodulation, the phase demodulation (synchronous detection) is performed by using the same carrier.

Figure 5:
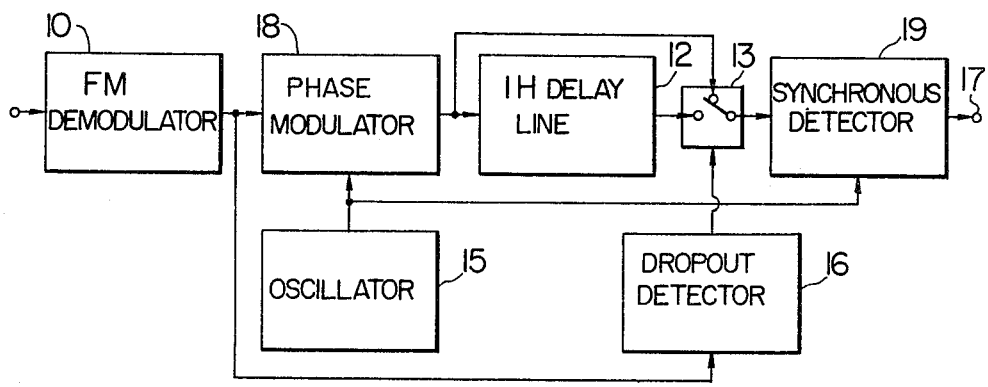
FIG. 5 is a block diagram showing another embodiment of this invention in which the phase modulation is performed.

FIG. 5 shows another embodiment of this invention in which the phase modulation is performed. For the simplification of explanation, the parts equivalent to those shown in FIG. 3 will not be enlarged on. It is noted that equivalent parts or elements are indicated by the same reference numerals throughout figures. In FIG. 5, the reproduced video signal, which is the demodulated output of the FM demodulator 10, is supplied to a phase modulator 18 and subjected to phase modulation in the phase modulator 18 by the use of a signal generted by the oscillator 15. The output of the phase modulator 18 is supplied to the 1H delay line 12 and the change-over switch 13. The output of the 1H delay line 12 is supplied to the change-over switch 13 and the change-over switch 13 selects one of the delayed signal and the non-delayed signal in response to the control signal sent from the dropout detector 16. Accordingly, the change-over switch 13 delivers a dropout-compensated phase-modulated signal, which is supplied to a synchronous detector 19. The synchronous detector 19 also receives the signal from the oscillator 15 and performes a synchronously detecting operation in accordance with the signal so that a video signal with dropouts compensated is delivered to the output terminal 17.

In the above method using the amplitude modulation, if the level of the delayed signal having the delay time of the 1H period differs from that of the non-delayed signal (the level of a signal passed through a delay line is attenuated and an amplifier is used to compensate for the attenuation of the level), the level of the dropout-compensating signal differs from that of the dropout-compensated signal. As a result of this, the compensation of dropouts becomes imperfect. In order to make the compensation complete, the levels of the compensating and the compensated signals must be made equal to each other. However, these levels sometimes differ from each other owing to the temperature dependancy of the attenuation factor of the 1H delay line.

Such a problem of level difference can be eliminated by using the PM modulation in which phase variation is small. For example, with a PM modulation having a degree 90°–40° of modulation in terms of phase angle, the video signal has a strong line correlation (correlation with respect to the line leading a 1H period) and the phase of the delayed PM signal having a delay of 1H period nearly equals the phase of the non-delayed PM signal. Accordingly, in this case, such a noise spike as generated in the conventional FM modulation method is never generated.

Figure 6:
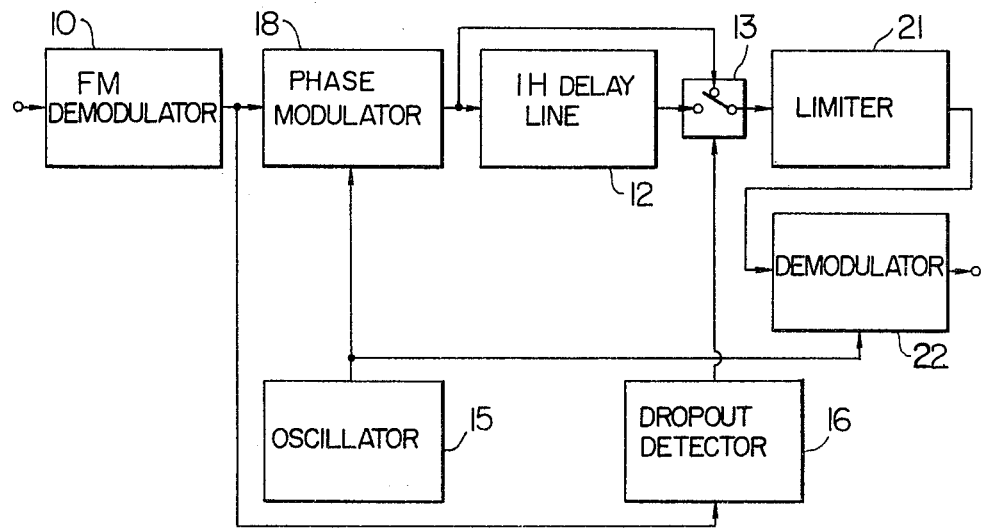
FIG. 6 is a block diagram showing still another embodiment of this invention in which the PM modulation is employed.

FIG. 6 shows another embodiment of this invention in which the PM modulation is employed. As shown in FIG. 6, the reproduced video signal from the FM demodulator 10 is pulse-modulated by using the signal from the oscillator 15 and the phase-modulated or PM signal is supplied to the 1H delay line 12 and the change-over switch 13. The output of the 1H delay line 12 is supplied to the change-over switch 13. The change-over switch 13 selects one of the delayed and the non-delayed signals in response to the control signal from the dropout detector 16. As a result, a dropout-compensated phase-modulated signal is supplied from the switch 13 to a limiter 21. The limiter 21 serves to make the difference in level between the output of the switch 13 which has no delay and the output of the switch 13 which has a delay of 1H period to be reduced to zero. The output of the limiter 21 is supplied to a demodulator 22. The demodulator 22 performs a PM demodulation operation by using the signal from the oscillator 15 and delivers a reproduced video signal with dropout compensated to the output terminal 17.

Figure 7:
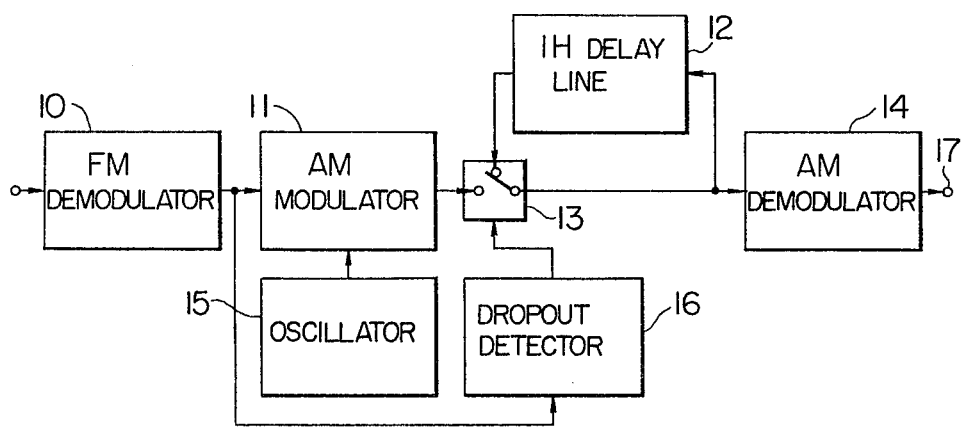
FIG. 7 shows still another embodiment of this invention in which one period longer than a horizontal scanning period is covered.

FIG. 7 shows still another embodiment of this invention which can be applied also for the compensation of dropouts covering a period longer than a horizontal scanning period. This embodiment differs from that shown in FIG. 3 in that a portion of the output of the change-over switch 13 is fed back to one of the input of the switch 13 through the delay line 12. In this circuit, it is understood that a dropout lasting longer than the 1H period can be compensated by a signal which circulates through the closed loop of the delay line 12 that is established in response to the output signal of the dropout detector 16.

As described above, according to this invention, noise spikes generated due to phase difference in the conventional dropout compensating method wherein the FM signal having no dropout and delayed a 1H period is substituted into the duration of the dropout, will never be generated so that an effective dropout compensation can be performed. Moreover, according to this invention, since the signals changed over by the switch 13 has no dc component, there is no need for the adjustment in which the levels of these signals are made equal to each other. I claim:

1. A dropout compensating device comprising
    a first demodulating means for obtaining a reproduced video signal through the angle demodulation of the angle-modulated signal reproduced from a recording medium recording angle-modulated video signals therein;
    a carrier generating means for generating a carrier wave;
    a modulating means for phase- or amplitude-modulating said carrier wave by said reproduced video signal to produce a remodulated video signal;
    a delaying means for obtaining a compensating signal by delaying the phase- or amplitude-modulated signal about one horizontal scanning period;
    a detecting means for detecting the amplitude of said angle-modulated signal reproduced from said recording medium and for delivering a signal indicative of a dropout when the detected amplitude is below a preset level;
    a switching means for transmitting said compensating signal in place of said remodulated video signal signal when there is an output of said detecting means; and
    a second demodulatig means for obtaining a demodulated video signal by demodulating the output of said switching means.

2. A dropout compensating device as claimed in claim 1, wherein said delaying means is a delay line having a delay time equal to one horizontal scanning period and the frequency of said carrier wave is an integral multiple of the horizontal scanning frequency.

3. A dropout compensating device as claimed in claim 1, wherein the frequency f of said carrier wave is such that $f=(N+\frac{1}{2})\times f_H$, where $f_H$ is the horizontal scanning frequency and N is any integer, and said delaying means is a delay line having a delay time of $(T_H\pm 1/f)$, where $T_H$ is the horizontal scanning period.

4. A dropout compensating device as claimed in claim 1, wherein the frequency f of said carrier wave equals $(N+\frac{1}{2})\times f_H$, where N is any integer and $f_H$ is the horizontal scanning frequency, and said delaying means comprising a delay line having a delay time equal to one horizontal scanning period and a phase inverter.

5. A dropout compensating device as claimed in claim 4, wherein said frequency f of said carrier wave equals the chrominance subcarrier frequency.

* * * * *